United States Patent
Zhang et al.

(10) Patent No.: US 12,086,989 B2
(45) Date of Patent: Sep. 10, 2024

(54) MEDICAL IMAGE SEGMENTATION METHOD BASED ON U-NETWORK

(71) Applicant: Nanjing University of Posts and Telecommunications, Nanjing (CN)

(72) Inventors: Dengyin Zhang, Nanjing (CN); Weidan Yan, Nanjing (CN); Rong Zhao, Nanjing (CN); Hong Zhu, Nanjing (CN); Shuo Yang, Nanjing (CN); Qunjian Du, Nanjing (CN); Junjie Sun, Nanjing (CN)

(*) Notice: Subject to any disclaimer, the term of this patent is extended or adjusted under 35 U.S.C. 154(b) by 371 days.

(21) Appl. No.: 17/697,884

(22) Filed: Mar. 17, 2022

(65) Prior Publication Data

US 2022/0398737 A1 Dec. 15, 2022

Related U.S. Application Data

(63) Continuation-in-part of application No. PCT/CN2021/138825, filed on Dec. 16, 2021.

(30) Foreign Application Priority Data

Jun. 10, 2021 (CN) .......................... 202110654344.4

(51) Int. Cl.
| | | |
|---|---|---|
| G06T 7/11 | (2017.01) | |
| G06T 3/40 | (2024.01) | |
| G06T 3/4046 | (2024.01) | |
| G06T 5/50 | (2006.01) | |
| G06T 7/00 | (2017.01) | |

(52) U.S. Cl.
CPC .............. *G06T 7/11* (2017.01); *G06T 3/4046* (2013.01); *G06T 5/50* (2013.01); *G06T 7/0012* (2013.01); *G06T 2207/20081* (2013.01); *G06T 2207/20084* (2013.01); *G06T 2207/20221* (2013.01); *G06T 2207/30088* (2013.01)

(58) Field of Classification Search
CPC . G06T 7/11; G06T 3/4046; G06T 5/50; G06T 7/0012; G06T 2207/20081; G06T 2207/20084; G06T 2207/20221; G06T 2207/30088
See application file for complete search history.

(56) References Cited

U.S. PATENT DOCUMENTS

2020/0202533 A1* 6/2020 Cohen ..................... G06T 7/194

FOREIGN PATENT DOCUMENTS

CN 111970513 A * 11/2020

* cited by examiner

*Primary Examiner* — Quang N Vo

(57) ABSTRACT

A medical image segmentation method include: 1) acquiring a medical image data set; 2) acquiring, from the medical image data set, an original image and a real segmentation image of a target region in the original image in pair to serve as an input data set of a pre-built constant-scaling segmentation network, the input data set including a training set, a verification set, and a test set; 3) training the constant-scaling segmentation network by using the training set to obtain a trained segmentation network model, and verifying the constant-scaling segmentation network by using the verification set, the constant-scaling segmentation network including a feature extraction module and a resolution amplifying module; and 4) inputting the original image to be segmented into the segmentation network model for segmentation to obtain a real segmentation image.

6 Claims, 3 Drawing Sheets

MEDICAL IMAGE SEGMENTATION METHOD BASED ON U-NETWORK

CROSS-REFERENCE TO RELATED APPLICATIONS

This application is a continuation-in-part of International Patent Application No. PCT/CN2021/138825 with an international filing date of Dec. 16, 2021, designating the United States, now pending, and further claims foreign priority benefits to Chinese Patent Application No. 202110654344.4 filed Jun. 10, 2021. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the field of image processing, and more particularly to a medical image segmentation method based on a U-network.

Existing image segmentation methods can be classified into conventional image segmentation methods and image segmentation methods based on deep learning. The conventional image segmentation methods process images mainly by digital image processing, mathematics, physics, optics, topology and other knowledge, and include threshold-based segmentation methods, region-based segmentation methods, boundary-based segmentation methods, segmentation methods based on wavelet analysis and transformation, and segmentation methods based on genetic algorithms. In the conventional image segmentation methods, segmentation is mainly achieved by edge and algorithm characteristics, which tends to ignore the deep semantic class information of images. In recent years, deep learning has made a great progress in the field of computer vision, and some deep learning methods are approaching artificial judgment. Therefore, image segmentation using deep learning methods gradually become the mainstream. These methods are not limited by a priori knowledge, and can achieve better effects in the case of good network training.

U-Net is a breakthrough of deep learning in the medical image segmentation. U-Net is formed by improving a fully convolutional network (FCN), and consists of an encoder, a bottleneck module and a decoder. Since its U-structure combines context information with fast training speed and small amount of data used, the U-Net satisfies the requirements of medical image segmentation and is widely applied in medical image segmentation. Since the emergence of U-Net, the encoder-decoder-skip network structure has aroused a large number of medical image segmentation methods improved based on the U-Net structure. With the development of the deep learning technology, in the U-Net based infrastructure including attention mechanisms, dense modules, feature enhancement and evaluation function improvement, introducing the latest technologies developed by the deep neural network into the application of medical image segmentation has become a widely used improvement method. These related operations are directed to different optimization objectives, or improve the accuracy, operation efficiency and application range of medical image segmentation by improving structures, adding new modules or in other ways.

However, in the current medical segmentation field, due to the continuous "convolution-pooling" operation in the neural network, a lot of space and detail information in shallow layers are lost, and the overall segmentation effect is unsatisfactory when the targets (organs or lesions) to be segmented are quite different.

SUMMARY

The disclosure provides a medical image segmentation method based on a U-network, which combines a constant-scaling residual network with a cyclic neural network to replace the original codec module, solves the problems of the semantic gap possibly caused by the connection between shallow layers and deep layers of the U-network and the loss of information in the shallow layers during the maximum pooling down-sampling process, fully captures target regions of different sizes, improves the segmentation accuracy of segmented targets of different sizes, and can obtain more image feature information while training a deeper network.

The disclosure provides a medical image segmentation method based on a U-network, the method comprising:
1) acquiring a medical image data set;
2) acquiring, from the medical image data set, an original image and a real segmentation image of a target region in the original image in pair to serve as an input data set of a pre-built constant-scaling segmentation network, the input data set comprising a training set, a verification set, and a test set;
3) training the constant-scaling segmentation network by using the training set to obtain a trained segmentation network model, and verifying the constant-scaling segmentation network by using the verification set, the constant-scaling segmentation network comprising a feature extraction module and a resolution amplifying module, each decoder layer being connected to the corresponding tailored feature map from the corresponding layer of the encoder during the decoding process; and
4) inputting the original image to be segmented into the segmentation network model for segmentation to obtain a real segmentation image.

In a class of this embodiment, the ratio of the training set to the verification set to the test set in the input data set is 6:2:2.

In a class of this embodiment, in 3), the feature extraction module comprises five first constant scaling modules and four down-sampling modules, the five first constant scaling modules being connected to one another through the four down-sampling modules; and, the resolution amplifying module comprises four up-sampling modules and four second constant scaling modules, the four second constant scaling modules being connected to one another through the four up-sampling modules.

In a class of this embodiment, each of the constant scaling modules comprises a constant-scaling residual network structure and a cyclic neural network; the output of the constant-scaling residual network structure is formed by adding two parts: a product of multiplying the input feature map by a weight a; and, a product of multiplying the input feature map by a weight b after passing through a weight layer twice, the weight a and the weight b satisfying the following relationship:

$$a+b=1 \qquad (1).$$

In a class of this embodiment, the cyclic neural network enters a convolution layer from the input feature map for repeated convolution operation, and the feature information obtained by a previous convolution operation is acquired by each convolution operation and output through a ReLu activation function.

In a class of this embodiment, the weight layer in the constant-scaling residual network structure of the constant scaling module is replaced with the cyclic neural network to form a constant scaling module, and the output of the constant scaling module is formed by adding two parts: a product of multiplying the input feature map by the weight a; and, a product of multiplying the input feature map by the weight b after passing twice through a cyclic convolution block comprising a convolution block and a ReLu activation function, the weight a and the weight b satisfying the formula (1).

In a class of this embodiment, in 3), in the constant-scaling segmentation network, the loss function is set as a set similarity measure function, which is expressed by the following formula:

$$\text{Dice} = \frac{2|A \cap B|}{|A| + |B|}, \quad (2)$$

where $|A \cap B|$ represents the common elements between the set A and the set B; $|A|$ represents the number of elements in the set A; $|B|$ represents the number of elements in the set B; the elements in the set A are real segmentation images obtained after segmentation by the constant-scaling segmentation network using the input data set; and, the elements in the set B are real segmentation images of target regions in the original image.

To calculate the set similarity measure function of the predicted real segmentation image, $|A|+|B|$ is approximate to a dot product of multiplication of actually segmented images and the real segmentation images, and values of each pixel point in the set A and the set B are added; and, when the loss function is minimal, the training is stopped thereby obtaining the trained segmentation network model.

In a class of this embodiment, in 3), stopping training when the loss function is minimal to obtain the trained segmentation network model comprises the following steps:

3.1) initializing weight parameters of the constant-scaling segmentation network in each stage on the basis of an Adam optimizer, and randomly initializing the weight parameters by using a Gaussian distribution with an average value of 0;

3.2) for each sample image that is input into the training set of the segmentation network model and comprises a composite image and the original image, calculating a total error between the real segmentation image obtained by the constant-scaling segmentation network and the real segmentation image of the target region in the original image by forward propagation, then calculating a partial derivative of each weight parameter by back propagation, and updating the weight parameters by a gradient descent method; and 3.3) repeating 3.1) and 3.2) until the loss function is minimal, to obtain the trained segmentation network model.

The following advantages are associated with the medical image segmentation method based on a U-network of the disclosure.

First, from the perspective of improving the encoder and the decoder, and by combining other network models with particular functions, the problems that the conventional U-network loses the ability to capture detail information and the information features of deep and shallow layers are captured incompletely are solved, the adaptability to different segmentation tasks is improved, and the final result of segmentation is improved.

Second, in the constant-scaling residual network provided in the disclosure, different combinations of values of the weight a and the weight b are used before the feature information is output. The weight a controls the feature information of the original input image, and the weight b controls the semantic information extracted by the weight layer. Thus, different combination modes can be selected in different medical image scenarios, the proportion of the feature information in shallow layers transmitted to the next layer is flexibly improved, and the availability and sensitivity of the model algorithm are enhanced.

Third, the constant-scaling segmentation network used in the disclosure fuses the constant-scaling residual network with the cyclic neural network. The residual network uses a jump structure to associate the spatial features of shallow layers with the semantics of deep layers through weight values, and the cyclic neural network further excavates the deep semantic information of the input image, so that the semantic gap caused by direct connection in the conventional U-network is improved, the extraction of detail information is enhanced, and the fusion effect of feature maps in different layers is improved.

DETAILED DESCRIPTION

Figure 1:
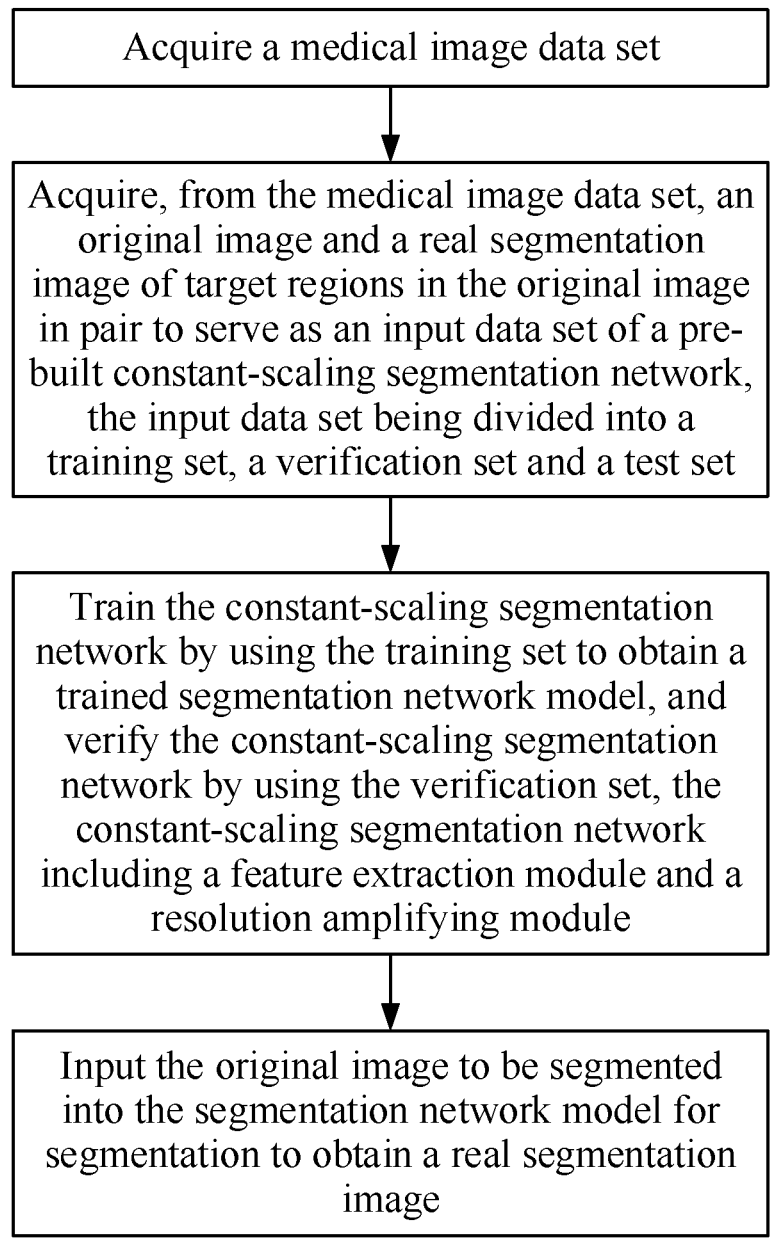
FIG. 1 is a flowchart of a method according to an embodiment of the disclosure.

To further illustrate, embodiments detailing a medical image segmentation method based on a U-network are described below. It should be noted that the following embodiments are intended to describe and not to limit the disclosure.

As shown in FIGS. 1-5, the disclosure provides a medical image segmentation method based on a U-network, which is detailed as follows.

Step 1: A medical image data set is acquired.

Step 2: An original image and a real segmentation image of a target region in the original image in pair are acquired from the medical image data set to serve as an input data set of a pre-built constant-scaling segmentation network. The input data set is divided into a training set, a verification set and a test set. The ratio of the training set to the verification set to the test set in the input data set is 6:2:2.

Step 3: The constant-scaling segmentation network is trained by using the training set to obtain a trained segmentation network model, and the constant-scaling segmentation network is verified by using the verification set. The constant-scaling segmentation network comprises a feature extraction module and a resolution amplifying module. Each decoder layer is connected to the corresponding tailored feature map from the corresponding layer of the encoder during the decoding process. The feature extraction module comprises five first constant scaling modules and four down-sampling modules, and the constant scaling modules are connected through the down-sampling modules. The resolution amplifying module comprises four up-sampling modules and four second constant scaling modules, and the second constant scaling modules are connected through the up-sampling modules.

Each of the constant scaling modules comprises a constant-scaling residual network structure and a cyclic neural network. The output of the constant-scaling residual network structure is formed by adding two parts: a product of multiplying the input feature map by a weight a; and, a product of multiplying the input feature map by a weight b after passing through a weight layer twice, wherein the weight a and the weight b satisfies the following relationship:

$$a+b=1 \tag{1}$$

The cyclic neural network enters a convolution layer from the input feature map for repeated convolution operation, and the feature information obtained by a previous convolution operation is acquired by each convolution operation and output through a ReLu activation function.

The weight layer in the constant-scaling residual network structure of the constant scaling module is replaced with the cyclic neural network to form a constant scaling module, and the output of the constant scaling module is formed by adding two parts: a product of multiplying the input feature map by the weight a; and, a product of multiplying the input feature map by the weight b after passing twice through a cyclic convolution block comprising a convolution block and a ReLu activation function, wherein the weight a and the weight b satisfies the formula (1).

In the constant-scaling segmentation network, the loss function is set as a set similarity measure function, which is expressed by the following formula:

$$\text{Dice} = \frac{2|A \cap B|}{|A|+|B|}, \tag{2}$$

where $|A \cap B|$ represents the common elements between the set A and the set B; $|A|$ represents the number of elements in the set A; $|B|$ represents the number of elements in the set B; the elements in the set A are real segmentation images obtained after segmentation by the constant-scaling segmentation network using the input data set; and, the elements in the set B are real segmentation images of target regions in the original image.

To calculate the set similarity measure function of the predicted real segmentation image, $|A|+|B|$ is approximate to a dot product of multiplication of actually segmented images and the real segmentation images, and values of each pixel point in the set A and the set B are added; and, when the loss function is minimal, the training is stopped thereby obtaining the trained segmentation network model.

Stopping training when the loss function is minimal to obtain the trained segmentation network model comprises the following steps:

3.1) initializing weight parameters of the constant-scaling segmentation network in each stage on the basis of an Adam optimizer, and randomly initializing the weight parameters by using a Gaussian distribution with an average value of 0;

3.2) for each sample image that is input into the training set of the segmentation network model and comprises a composite image and the original image, calculating a total error between the real segmentation image obtained by the constant-scaling segmentation network and the real segmentation image of the target region in the original image by forward propagation, then calculating a partial derivative of each weight parameter by back propagation, and updating the weight parameters by a gradient descent method; and 3.3) repeating 3.1) and 3.2) until the loss function is minimal, to obtain the trained segmentation network model.

Step 4: The original image to be segmented is input into the segmentation network model for segmentation to obtain a real segmentation image.

The constant-scaling segmentation network used in the disclosure fuses the constant-scaling residual network with the cyclic neural network. The residual network uses a jump structure to associate the spatial features of shallow layers with the semantics of deep layers through weight values, and the cyclic neural network further excavates the deep semantic information of the input image, so that the semantic gap caused by direct connection in the conventional U-network is improved, the extraction of detail information is enhanced, and the fusion effect of feature maps in different layers is improved.

The design content in the above embodiment will be described below by a preferred embodiment.

Step 1: A medical image data set is acquired. In this embodiment, the medical image data set is a skin disease data of the ISIC challenge: melanoma detection in 2018.

The medical image data set is downloaded and called from the existing medical image database.

Step 2: Original melanoma images and real segmentation labels in pairs are extracted from the medical image data set of melanoma detection, and the data set is then classified into a training set, a verification set and a test set at a ratio of 6:2:2.

Figure 2:
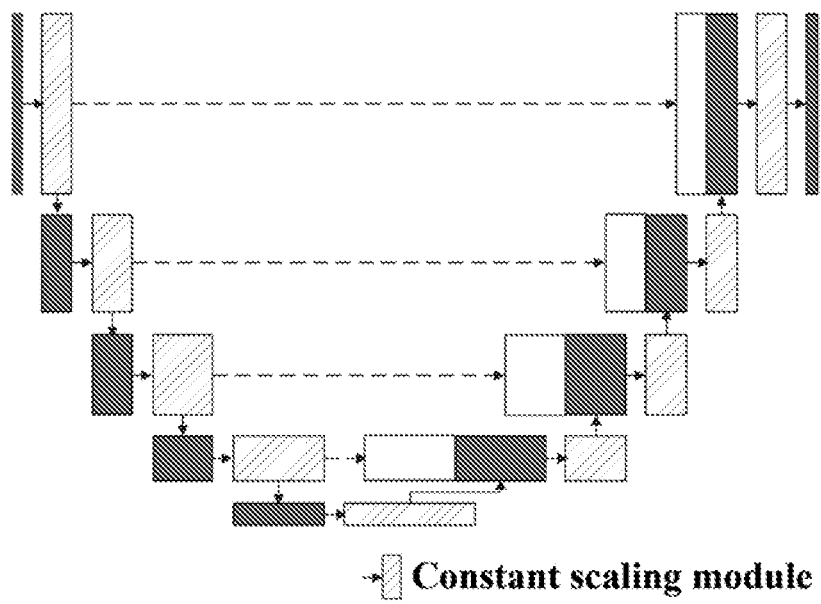
FIG. 2 is a schematic diagram of a constant-scaling segmentation network structure according to an embodiment of the disclosure.
Figure 3:
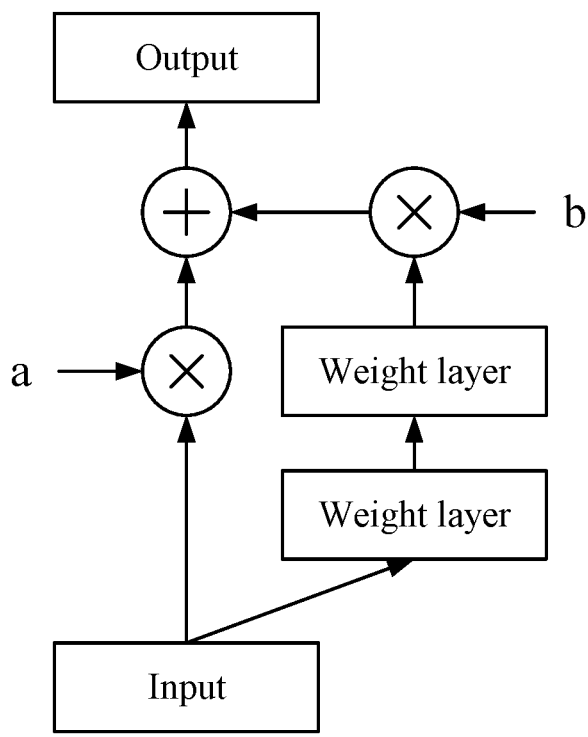
FIG. 3 is a schematic diagram of a constant-scaling residual network structure according to an embodiment of the disclosure.
Figure 4:
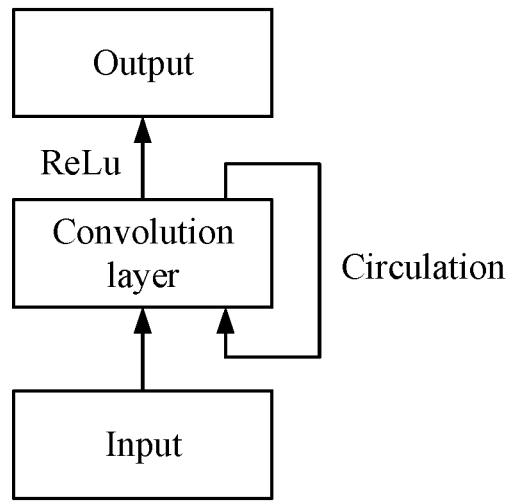
FIG. 4 is a schematic diagram of a cyclic network structure according to an embodiment of the disclosure.
Figure 5:
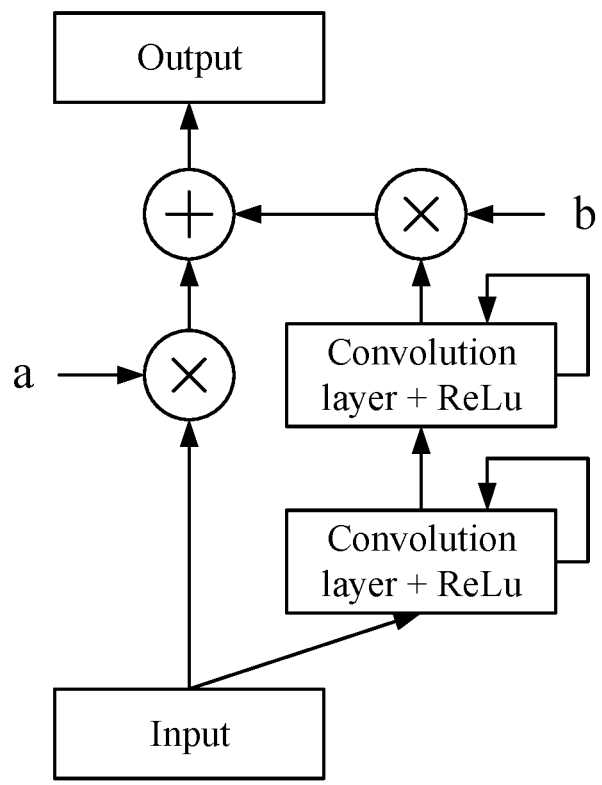
FIG. 5 is a schematic diagram of a constant scaling module according to an embodiment of the disclosure.

Step 3: A constant-scaling segmentation network is trained by using the input data set in step 2. The constant-scaling segmentation network comprises a feature extraction module and a resolution amplifying module, and each decoder layer is connected to the corresponding tailored feature map from the same layer of the encoder. The test set and the verification set in step 2 are input into the constant-scaling segmentation network of the disclosure (as shown in FIG. 2). The feature extraction module comprises five constant scaling modules and four down-sampling modules, and the constant scaling modules are connected through the down-sampling modules. The resolution amplifying module comprises four up-sampling modules and four constant scaling modules, and up-sampling is performed before the constant scaling modules. The output of the constant scaling module (as shown in FIG. 5) is formed by adding two parts: (1) a product of multiplying the input feature map by a weight a; and, (2) a product of multiplying the input feature map by a weight b after passing a cyclic convolution block comprising a convolution block and a ReLu activation function twice.

If it is assumed that $x_l$ is the input of the cyclic convolution block in the $l_{th}$ layer and the coordinates of a pixel point of $x_l$ in the $k_{th}$ feature map of the cyclic convolution layer, at moment t, the output $O_{ijk}^l(t)$ of the cyclic convolution layer can be expressed as:

$$O_{ijk}^l(t)=(w_k^f)^T * x_l^{f(i,j)}(t)+(w_k^r)^T * x_l^{r(i,j)}(t-1)+b_k, \tag{3}$$

where $x_l^{f(i,j)}$ and $x_l^{r(i,j)}(t-1)$ represent the inputs of two standard convolution layers in the $l_{th}$ cyclic convolution layer, respectively; $w_k^f$ and $w_k^r$ represent weight vectors of the $k_{th}$ feature maps of the two standard convolution layers in the $l_{th}$ cyclic convolution layer, respectively; and, $b_k$ is an offset. The output of the cyclic convolution layer is processed by a standard ReLU, i.e., a function $f(\cdot)$, to obtain:

$$\mathcal{F}(x_l, w_l) = f(O_{ijk}^l(t)) = \max(O, O_{ijk}^l(t)), \quad (4)$$

where $\mathcal{F}(x_l, w_l)$ represents the output of the cyclic convolution network in the $l_{th}$ layer, and the output $x_{l+1}$ of the residual cyclic network in the $l_{th}$ layer is expressed as:

$$x_{l+1} = a * x_l + b * \mathcal{F}(x_l, w_l). \quad (5)$$

Step 4: Specifically, a loss function of the constant-scaling segmentation network is set.

In terms of the segmentation network, the Loss function is set as a dice coefficient commonly used in medicine, which is expressed by the following formula:

$$\text{Dice} = \frac{2|A \cap B|}{|A| + |B|}$$

where $|A \cap B|$ represents the common elements between the set A and the set B; $|A|$ represents the number of elements in the set A; $|B|$ represents the number of elements in the set B; the elements in the set A are real segmentation images obtained after segmentation by the constant-scaling segmentation network using the input data set; and, the elements in the set B are real segmentation images of target regions in the original image.

To calculate the set similarity measure function of the predicted real segmentation image, $|A|+|B|$ is approximate to a dot product of multiplication of actually segmented images and the real segmentation images, and values of each pixel point in the set A and the set B are added. When the loss function is minimal, the training is stopped thereby obtaining the trained segmentation network model. To calculate the dice coefficient of the predicted segmentation image, $|A|+|B|$ is approximate to a dot product of multiplication of the prediction image and the label, and the elements in the set A and the set B are added.

Step 5: The segmentation network is trained.

To minimize the loss function in step 5, an Adam optimizer is used to initialize the weight parameters of the network in each stage, and the weight parameters are randomly initialized by using a Gaussian distribution with an average value of 0.

For each sample image x, a total error is calculated by forward propagation, a partial derivative of each weight parameter is calculated by back propagation, and the weight parameters are finally updated by a gradient descent method. This step is repeated until the loss function is minimal, to obtain the trained segmentation network model.

Step 6: The melanoma image to be segmented is input into the segmentation network of the disclosure to obtain a segmented melanoma image.

In the process of segmenting the melanoma data set, in the disclosure, by improving the original U-network structure, the loss of detail information in shallow layers during the down-sampling process is improved. By combining the constant-scaling residual network with the cyclic neural network, the fusion of semantics of deep and shallow layers is further improved, the semantic gap is reduced, and the accuracy of segmentation of the background and foreground of medical images is improved. Moreover, for the medical image segmentation in different scenarios, different combinations of weights can be selected. In multiple scenarios, the method of the disclosure has good applicability.

It will be obvious to those skilled in the art that changes and modifications may be made, and therefore, the aim in the appended claims is to cover all such changes and modifications.

What is claimed is:

1. A method executed by a computer, the method comprising:
   1) acquiring a medical image data set;
   2) acquiring, from the medical image data set, an original image and a real segmentation image of a target region in the original image in pair to serve as an input data set of a pre-built constant-scaling segmentation network, the input data set comprising a training set, a verification set and a test set;
   3) training the constant-scaling segmentation network by using the training set to obtain a trained segmentation network model, and verifying the constant-scaling segmentation network by using the verification set, the constant-scaling segmentation network comprising a feature extraction module and a resolution amplifying module, wherein, during decoding, each decoder layer is connected to a corresponding tailored feature map from a corresponding layer of an encoder; and
   4) inputting the original image to be segmented into the segmentation network model for segmentation to obtain a real segmentation image;
   wherein in 3), in the constant-scaling segmentation network, a loss function is set as a set similarity measure function, which is expressed by the following formula:

$$\text{Dice} = \frac{2|A \cap B|}{|A| + |B|}, \quad (2)$$

where $|A \cap B|$ represents common elements between a set A and a set B; $|A|$ represents a number of elements in the set A; $|B|$ represents a number of elements in the set B; the elements in the set A are real segmentation images obtained after segmentation by the constant-scaling segmentation network using the input data set; and, the elements in the set B are real segmentation images of the target region in the original image; and
   to calculate the set similarity measure function of a predicted real segmentation image, $|A|+|B|$ is approximate to a dot product of multiplication of an actually segmented image and the real segmentation image, and values of each pixel point in the set A and the set B are added; and, when the loss function is minimal, the training is stopped to obtain the trained segmentation network model;
   wherein in 3), stopping training when the loss function is minimal to obtain the trained segmentation network model comprises:
   3.1) initializing weight parameters of the constant-scaling segmentation network in each stage on the basis of an Adam optimizer, and randomly initializing the weight parameters by using a Gaussian distribution with an average value of 0;
   3.2) for each sample image that is input into the training set of the segmentation network model and comprises a composite image and the original image, calculating a total error between the real segmentation image obtained by the constant-scaling segmentation network and the real segmentation image of the target region in the original image by forward propagation, then calculating a partial derivative of each weight parameter by back propagation, and updating the weight parameters by a gradient descent method; and 3.3) repeating 3.1) and 3.2) until the loss function is minimal, to obtain the trained segmentation network model.

2. The method of claim 1, wherein in 2), a ratio of the training set to the verification set to the test set in the input data set is 6:2:2.

3. The method of claim 1, wherein in 3), the feature extraction module comprises five first constant scaling modules and four down-sampling modules, the five first constant scaling modules being connected to one another through the four down-sampling modules; and, the resolution amplifying module comprises four up-sampling modules and four second constant scaling modules, the four second constant scaling modules being connected to one another through the four up-sampling modules.

4. The method of claim 3, wherein each of the constant scaling modules comprises a constant-scaling residual network structure and a cyclic neural network; an output of the constant-scaling residual network structure is formed by adding two parts: a product of multiplying an input feature map by a weight a; and, a product of multiplying the input feature map by a weight b after passing through a weight layer of the cyclic neural network twice, the weight a and the weight b satisfying the following relationship:

$$a+b=1 \tag{1}$$

5. The method of claim 4, wherein the cyclic neural network enters a convolution layer in the cyclic neural network from the input feature map for repeated convolution operation, and feature information obtained by a previous convolution operation is acquired by each convolution operation and output through a ReLu activation function.

6. The method of claim 5, wherein the weight layer in the constant-scaling residual network structure of the constant scaling module is replaced with the cyclic neural network to form a constant scaling module, and an output of the constant scaling module is formed by adding two parts: a product of multiplying the input feature map by the weight a; and, a product of multiplying the input feature map by the weight b after passing twice through a cyclic convolution block comprising a convolution block and a ReLu activation function, and the weight a and the weight b satisfying the formula (1).

* * * * *